United States Patent Office 3,364,001
Patented Jan. 16, 1968

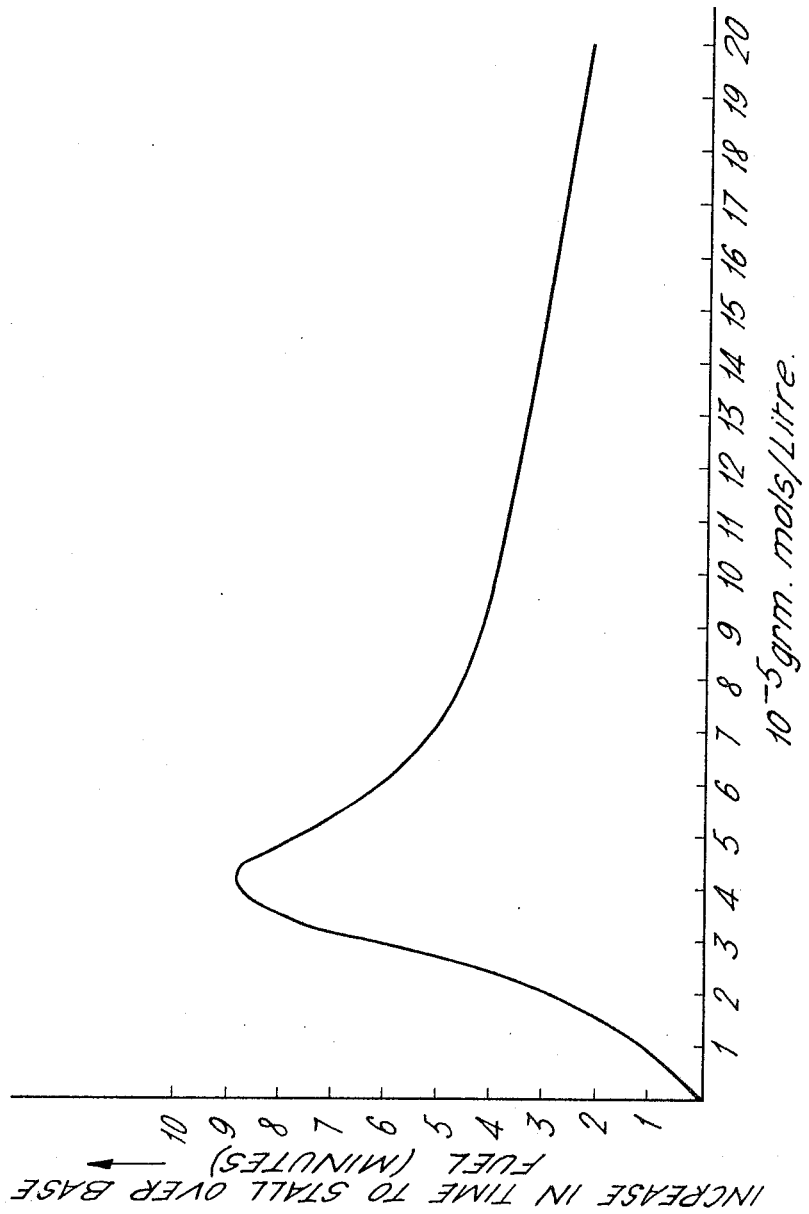
Alan Yule Drummond
Alan Harold Edwards    Inventors
Leslie John Shephard

3,364,001
PETROLEUM FUEL CONTAINING TERTIARY
ALKANOLAMINE ESTER
Alan Y. Drummond, Sutton Courtenay, Alan H. Edwards, Dorchester-on-Thames, Oxford, and Leslie J. Shephard, Goring, near Reading, England, assignors to Esso Research and Engineering Company, a corporation of Delaware
Filed Jan. 17, 1964, Ser. No. 338,433
Claims priority, application Great Britain, Jan. 17, 1963, 2,076/63
4 Claims. (Cl. 44—71)

This invention relates to a class of compounds which are suitable for incorporation in fuel oils to improve the properties thereof, and particularly relates to fuel oil compositions containing such additives.

The compounds of the invention are monoester derivatives of alkenyl-substituted succinic acid, and may be represented by the general formula:

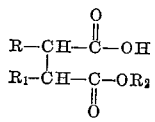

wherein one of R and $R_1$ is hydrogen and the remaining one of R and $R_1$ is an alkenyl group containing from 8 to 40 carbon atoms, preferably from 10 to 24 carbon atoms, and which also contains at least one ethylenically-unsaturated linkage, attached to one or other of the $\alpha$ carbon atoms of the succinic acid residues, and $R_2$ is the residue of a tertiary alkanolamine represented by the general formula

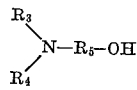

wherein $R_3$ and $R_4$ are $C_1$–$C_9$ alkyl groups and $R_5$ is a $C_2$ to $C_{10}$ methylene group.

The compounds according to the invention may conveniently be prepared by reaction of 1 mole of a mono alkenyl succinic anhydride or mono alkenyl succinic acid, with 1 mole of an alcohol as hereinbefore described. When the compounds are derived from the anhydride, the use of a tertiary alkanolamine as hereinbefore described allows the half ester to be formed by simple admixture at room temperatures. Using an alkanol, a heating step is necessary for esterification to take place with the substituted anhydride.

Mono-succinic anhydrides which may be used in the esterification process are preferably derived from succinic anhydride and a polymerized $C_2$–$C_4$ olefin. Particularly useful mono-alkylene succinic anhydrides are those in which the alkenyl group is derived from polyisobutylene of molecular weight from 110 to 550 or is a tetra propenyl group. The alkenylation reaction between the succinic anhydride and the polyolefin may be carried out by heating a mixture of reactants at elevated temperatures.

If the mono-ester products of the invention are derived from the corresponding alkenyl succinic acid, then the reaction between the acid and the alcohol is a condensation reaction, with the formation of water which may be removed from the reaction mixture by azeotropic distillation, with for instance toluene.

The compounds of the invention which incorporated in small proportions in gasoline inhibit the formation of ice in carburettors of spark-ignition engines when operated in cool moist atmospheres. For use as an anti-icing agent the additive is incorporated in the gasoline is from $1 \times 10^{-5}$ to $20 \times 10^{-5}$ grm. moles per litre, preferably from $2.5 \times 10^{-5}$ to $10 \times 10^{-5}$ grm. moles per litre.

The additives and compositions of the invention are illustrated by the following examples:

Four additive compounds were prepared by first alkenylating succinic anhydride with polyolefins as hereinafter described, and thereafter reacting the alkenyl succinic anhydride with N,N-diethylethanolamine.

In carrying out the process, 1 mol equivaelnt of the polyolefin was mixed with 1–2 mol equivalents of maleic anhydride. After purging with nitrogen, the reactants were heated to 450° F. for 24 hours, the mixture cooled and diluted. The alkenylated reaction product was then esterified with equal molar proportions of N,N-diethylethanolamine by simply mixing the reactants at room temperature. The additive compounds formed according to this process were identified as follows:

| Polyolefin used: | Esterified product identity |
|---|---|
| Polyisobutylene molecular wt. 300 | A |
| Polyisobutylene molecular wt. 460 | B |
| Polyisobutylene molecular wt. 660 | C |
| Tetrapropylene | D |

The anti-icing properties of gasolines containing the additives according to the invention are illustrated in the following test:

An A40 motor car was run on a test bed to simulate a road speed of 30 miles per hour, using a gasoline containing additive D of Example I, and allowed to idle after a predetermined period of time. The time at which the engine was run before stalling during the first minute of idling was ascertained, which time to stalling was taken as an index of the throttle plate icing. The results are shown in the accompanying graph, and it will be seen that for a gasoline containing additive D as hereinbefore described, the maximum time of running at a simulated 30 m.p.h. before stalling took place under the conditions of test was provided by a gasoline containing $4 \times 10^{-5}$ grm. mols/litre, and that no substantial improvement over the base gasoline was provided using a concentration of additive greater than $20 \times 10^{-5}$ grm./mols/litre of additive. These concentrations corresponded to maximum effect produced by 22 parts per million, with a total effective range of from 5 to 105 parts per million by weight, for this particular example.

A similar result was obtained using additive A as hereinbefore described, except that the maximum time to stall in the test described was 4 minutes, at a concentration of $15 \times 10^{-5}$ grm. mols/litre of additive.

The additives of the invention when incorporated in fuel oils which may be gasoline, kerosenes, gas or diesel oils donate improved anti-corrosion properties when incorporated in such fuels, in that they inhibit the formation of rust on ferrous surfaces exposed to such oils in the presence of trace amounts of moisture. When used as anti-rust agents the proportions of additive used may range from $1 \times 10^{-5}$ grm. mols/litre. This effect is shown in the following example:

100 parts per million by weight of additive D were dissolved in a petroleum fraction boiling in the kerosene boiling range, and the kerosene was placed over water in a container. A strip of lead with a newly-abraded surface was immersed in the liquid, partly in the water and partly in the kerosene solution. After 6 weeks the portion of lead in the water had a bearing deposit of hydrous lead oxide, whereas the lead in the kerosene preserved its positive surface.

A control experiment using a kerosene containing 100 p.p.m. of lauric acid, a known corrosion inhibitor for ferrous metals, produced substantial corrosive deposits on lead immersed therein for 6 weeks.

As a further example of the use of the additives of the present invention as anti-corrosion agents, 100 parts per million of additive A hereinbefore described were incorporated in two samples of identical gas oil. Steel test strips were then immersed in oil for 30 secs., and then immersed in cylinders containing the gas oil compositions floating on water, so that half the test piece was immersed in water and half the test piece immersed in the oil composition. The samples were examined after a period of time, and a rating applied to the condition of the surface of the test pieces, 10 denoting a clean surface, and 0 denoting a surface completely covered with rust. The results were as follows:

| Sample | Merit rating after time interval | | |
|---|---|---|---|
| | 0 hours | 18 hours | 24 hours |
| Control gas oil | 10 | 2 | 1 |
| Gas oil containing additive "A" | 10 | 8 | 5 |

It will be observed that the gas oil containing the additive according to the invention was substantially less corrosive to steel than the same gas oil not containing the additive.

What is claimed is:

1. A petroleum fuel composition comprising a major proportion of a fuel from the class consisting of gasoline, kerosene, gas oil and diesel fuel and a minor proportion, in the range of $1 \times 10^{-5}$ to $50 \times 10^{-5}$ gram moles per liter of fuel, of a monoester of an alkenyl-substituted succinic acid represented by the general formula:

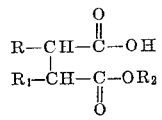

wherein one of R and $R_1$ is hydrogen and the remaining one of R and $R_1$ is an alkenyl group containing from 8 to 40 carbon atoms, and containing at least one ethylenically unsaturated linkage, attached to one of the α-carbon atoms, and $R_2$ is the residue of a tertiary alkanolamine represented by the general formula:

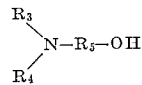

wherein $R_3$ and $R_4$ and $C_1$–$C_9$ alkyl groups and $R_5$ is a $C_2$–$C_{10}$ methylene group.

2. A composition as defined by claim 1, wherein $R_1$ is an alkenyl group derived from a $C_2$–$C_4$ olefin polymer of from about 110 to 550 molecular weight.

3. A composition as defined by claim 1, wherein said ester is an ester of N,N-diethylethanolamine.

4. A composition as defined by claim 1 wherein said fuel is gasoline and said ester is present in an amount sufficient to reduce the carburetor icing tendency of said gasoline.

References Cited

UNITED STATES PATENTS

| | | | |
|---|---|---|---|
| 2,982,630 | 5/1961 | Andress | 44—71 |
| 3,037,051 | 5/1962 | Stromberg | 44—71 |

DANIEL E. WYMAN, *Primary Examiner.*

Y. M. HARRIS, Y. H. SMITH, *Assistant Examiners.*